United States Patent
Moriya (10) Patent No.: US 7,636,519 B2
(45) Date of Patent: Dec. 22, 2009

(54) LENS CONTROL SYSTEM (75) Inventor: Chikatsu Moriya, Saitama (JP)

(73) Assignee: Fujinon Corporation, Saitama (JP)

( * ) Notice: Subject to any disclaimer, the term of this patent is extended or adjusted under 35 U.S.C. 154(b) by 478 days.

(21) Appl. No.: 11/527,675

(22) Filed: Sep. 27, 2006

(65) Prior Publication Data

US 2007/0071435 A1 Mar. 29, 2007

(30) Foreign Application Priority Data

Sep. 28, 2005 (JP) ............................. 2005-282762

(51) Int. Cl.
*G03B 3/10* (2006.01)
(52) U.S. Cl. .................................................... 396/131
(58) Field of Classification Search ................. 396/131, 396/86, 130; 348/208.11, 357
See application file for complete search history.

(56) References Cited

U.S. PATENT DOCUMENTS

| 5,884,107 A * | 3/1999 | Yajima ......................... 396/86 |
| 6,219,098 B1 * | 4/2001 | Kawamura et al. .......... 348/335 |
| 6,580,571 B2 * | 6/2003 | Sasaki et al. ................. 359/823 |
| 6,760,066 B1 * | 7/2004 | Kawamura et al. ........ 348/240.3 |
| 2002/0154223 A1 * | 10/2002 | Moriya ................... 348/208.11 |
| 2002/0176012 A1 * | 11/2002 | Wasada ....................... 348/239 |
| 2004/0036792 A1 * | 2/2004 | Moriya et al. ............... 348/345 |
| 2005/0195311 A1 * | 9/2005 | Sasaki ......................... 348/345 |

FOREIGN PATENT DOCUMENTS

JP 11-23943 A 1/1999

* cited by examiner

*Primary Examiner*—W B Perkey
(74) *Attorney, Agent, or Firm*—Birch, Stewart, Kolasch & Birch, LLP (57) ABSTRACT In a lens control system, a temporary target position is obtained such that the turning operation is not limited to a value within the movable range of the movable lens in correspondence with the rotational position of the operating member; a normal target position limited to a position within the movable range of the movable lens is set from the temporary target position; and the movable lens is moved to the normal target position. The temporary target position indicates an absolute rotational position of the operating member. If the temporary target position is a position within the movable range of the movable lens (other than the ends), the movable lens is set at the temporary target position, thereby ensuring that the movable lens is set at a fixed position with respect to the corresponding fixed position of the operating member.

16 Claims, 8 Drawing Sheets

ROTATIONAL POSITION OF FOCUSING OPERATING MEMBER

ROTATIONAL POSITION OF FOCUSING OPERATING MEMBER

LENS CONTROL SYSTEM

BACKGROUND OF THE INVENTION

1. Field of the Invention

The present invention relates to a lens control system and, more particularly, to a lens control system in which a movable lens such as a focusing lens is controlled according to an operation on an endlessly turnable operating member in lens control for a television lens apparatus or the like.

2. Description of the Related Art

A lens apparatus such as a one-rod unit/servo unit combination lens capable of changing operating units used for lens operation, a lens apparatus such as an automatic focusing (AF)/manual focusing (MF) selectable lens capable of changing focusing control between AF and MF and other lens apparatuses are known as television lens apparatuses.

For example, a one-rod unit/servo unit combination lens is arranged so that an operating unit used for lens operation can be selected from a one rod-two operations operating unit incorporated in a lens unit and a servo operating unit connected via a cable or the like. In the one rod-two operations operating unit, the focus position is changed when a one rod-two operations rod is turned, and the zoom position is changed when the one rod-two operations rod is pushed or pulled. In the servo operating unit, the focus position or the zoom position is changed when an operating member of a controller (a focus demand or a zoom demand) ordinarily used for servo control is operated. The one rod-two operations operating unit is ordinarily constructed as a mechanism through which an operating force applied to the one rod-two operations rod is mechanically transmitted as power for focusing (a focusing lens) or zooming (a zoom lens). As a one-rod unit/servo unit combination lens, those with a mechanism for servo control of focusing and zooming are also known in which servo control on focusing and zooming is performed for the operation of one rod-two operations rod by detecting the rotational position and pushed/pulled position of the one rod-two operations rod with position sensors.

Focusing operating units used in lens apparatuses capable of changing operating units and selecting between AF and MF include those having an endlessly turnable focusing operating member such that no end is provided as a limit to the range of turning of the focusing operating member. In such endless-type focusing operating units, detection of the rotational position of the focusing operating member is performed not by an absolute position detection type of position sensor such as a potentiometer but by a relative position detection type of position sensor (encoder) such as an incremental-type rotary encoder. This arrangement ensures that when operating units are changed or the focusing system is changed from AF to MF, the focus position set before the change is effectively taken over to enable the focus to be changed from the position at the time of change of the units according to the amount of operation (the amount of change in rotational position) of the focusing operating member thereafter performed. In such a case, since the focusing operating member is endlessly turnable, a drawback of limiting the originally set movable range of the focus by an end of the focusing operating member can be eliminated.

With the focusing operating member capable of endlessly turning as described above, there is a possibility of the focusing operating member being turned beyond the movable range of the focus (the range between the point-blank position and the infinity position in the mechanical construction of the focusing lens) because of the lack of turning limits. An operation performed as such turning to further turn the focusing operating member outwardly from the rotational position reached by the focusing operating member when the focus reaches the end (in a direction toward a point outside the end of the movable range of the focus) is ineffective and the focus position is fixed at the end position.

In the conventional art, even when the focusing operating member is turned so that one of the ends of the movable range of the focus is exceeded, the amount of operation of the focusing operating member turned outwardly in correspondence with the section outside the movable range is treated as zero. Therefore, when the focusing operating member is thereafter turned in the opposite (inward) direction (in the direction of movement of the focus toward the opposite end), the focus simultaneously moves toward the opposite end. In the case of focusing while viewing a picture in a viewfinder or the like, the above-described focusing operation is preferred because it ensures a reduction in the useless amount of operation.

[Patent document 1] Japanese Patent Application Laid-Open No. 11-23943

In some cases of actual use in image-taking jobs, a procedure may be used in which a focusing operating member of a focusing operating unit is operated before actual image taking for example to set a best-focus position or a desired focus position with respect to a subject to be imaged, and a mark is attached to the focusing operating unit to enable the desired condition to be instantly reproduced. For example, when the best focus is obtained, marks formed by a tape or the like are respectively attached in positions aligned with each other to the focusing operating member and a member supporting the focusing operating member, which member move relative to each other. Even if the focus is moved to a different position at the time of actual image taking, the focus may be instantly set at the best focus position confirmed in advance by referring to the mark attached to the focusing operating unit.

In a case where an endless-type focusing operating unit in which a focusing operating member such as that described above is endlessly turned is used, there is a problem that the method of attaching a mark to the focusing operating unit to enable reproduction of the desired focus position cannot be effectively used. That is, after the focusing operating member has been turned beyond a limit corresponding to one of the ends of the movable range of the focus, the focusing operating member may be operated in the opposite direction. In such a case, the amount of operation of the focusing operating member turned beyond the limit corresponding to the end of the movable range of the focus (the amount of over-operation) is treated as zero. For this reason, the marked focus cannot be reproduced even when the positions of marks attached to the focusing operating member and the member supporting the focusing operating member as described above are aligned with each other.

SUMMARY OF THE INVENTION

In view of the above-described circumstances, an object of the present invention is to provide a lens control system in which the position of a movable lens is controlled on the basis of the rotational position of an endlessly turnable operating member, and in which the movable lens can be set at a fixed rotational position with respect to the corresponding fixed position of the operating member.

To achieve the above-described object, according to a first aspect of the present invention, there is provided a lens control system comprising: an endlessly turnable operating member for indicating the position of a movable lens in an optical system for imaging a picture; a relative position detection device which detects the amount of change in the rotational position of the operating member; a temporary target position setting device which sets temporary target positions of the movable lens one after another, which obtains from the relative position detection device the amount of change in the rotational position of the operating member after setting the preceding temporary target position, and which sets, as the present temporary target position, the position displaced from the preceding temporary target position by the amount of displacement corresponding to the obtained amount of change; a normal target position setting device which sets normal target positions of the movable lens one after another, which, when the temporary target position set by the temporary target position setting device is within the movable range of the movable lens, sets as a normal target position the temporary target position set by the temporary target position setting device, and which, when the temporary target position set by the temporary target position setting device is out of the movable range of the movable lens, sets as a normal target position the position at the end of the movable range closer to the temporary target position; and a lens control device which moves the movable lens to the normal target position set by the normal target position setting device.

According to the present invention, a temporary target position is obtained such that the turning operation is not limited to a value within the movable range of the movable lens in correspondence with the rotational position of the operating member; a normal target position limited to a position within the movable range of the movable lens is set from the temporary target position; and the movable lens is moved to the normal target position. The temporary target position indicates an absolute rotational position of the operating member. If the temporary target position is a position within the movable range of the movable lens (other than the ends), the movable lens is set at the temporary target position, thereby ensuring that the movable lens is set at a fixed position with respect to the corresponding fixed position of the operating member.

According to a second aspect of the present invention, in the lens control system of the first aspect, the temporary target position setting device obtains from the relative position detection device the amount of change in the rotational position of the operating member after setting the preceding temporary target position, and wherein, when the position displaced from the preceding temporary target position by the amount of displacement corresponding to the obtained amount of change is out of the movable range of the movable lens, and when the amount of change from the position at the end of the movable range closer to the displaced position to the displaced position is larger than the amount of displacement corresponding to the amount of change of the rotational position of the operating member through 360 degrees, the temporary target position setting device sets as the present temporary target position the position displaced by the amount of displacement corresponding to the amount of change in the rotational position of the operating member through 360 degrees from the displaced position to the position of the end.

In the second aspect, the fact is considered that when the operating member is turned through 360 degrees at a rotational position outside the movable range of the movable lens, the same correspondence relationship between the rotational position of the operating member and the position of the movable lens in the movable range of the movable lens is maintained even if the relation is treated as if turning through 360 degrees has not be performed.

According to a third aspect of the present invention, the lens control system of the first or second aspect further comprises the temporary target position setting device as a first temporary target position setting device; a second temporary target position setting device which sets temporary target positions of the movable lens one after another, which obtains from the relative position detection device the amount of change in the rotational position of the operating member after setting the preceding temporary target position, which, when the position displaced from the preceding temporary target position by the amount of displacement corresponding to the obtained amount of change is within the movable range of the movable lens, sets the displaced position as the present temporary target position, and which, when the position displaced from the preceding temporary target position by the amount of displacement corresponding to the obtained amount of change is out of the movable range of the movable lens, sets as the present temporary target position the position displaced by the amount of displacement corresponding to the amount of change from the position of the end of the movable range closer to the displaced position; and a selecting device which makes selection as to which of the temporary target position set by the first temporary target position setting device and the temporary target position set by the second temporary target position setting device should be made effective, wherein the normal target position setting device sets the normal target position on the basis of the temporary target position made effective by the selecting device.

According to a fourth aspect of the present invention, in the lens control system of the first, second or third aspect, the movable lens comprises a lens for changing a focus of the optical system. In the fourth aspect, a focusing lens is provided as the movable lens to be controlled.

According to a fifth aspect of the present invention, in the control system of the fourth aspect, the operating member comprises an operating member for focusing provided in a focus controller connected to a lens unit having the optical system. In the fifth aspect, the operating member is provided in a focus controller (focus demand) connected to a lens unit via a cable or the like.

According to a sixth aspect of the present invention, in the lens control system of the fourth aspect, the operating member comprises an operating rod turned for focusing, the operating rod being provided on a lens unit having the optical system. In the sixth aspect, an operating rod such as a one axis-two operations rod turned for focusing is provided as the operating member.

According to the present invention, in the lens control system in which the position of a movable lens is controlled on the basis of the rotational position of an endlessly turnable operating member, the movable lens can be set at a fixed position with respect to the corresponding fixed position of the operating member.

DETAILED DESCRIPTION OF THE INVENTION

A preferred embodiment of the lens control system in accordance with the present invention will be described with reference to the accompanying drawings.

Figure 1:
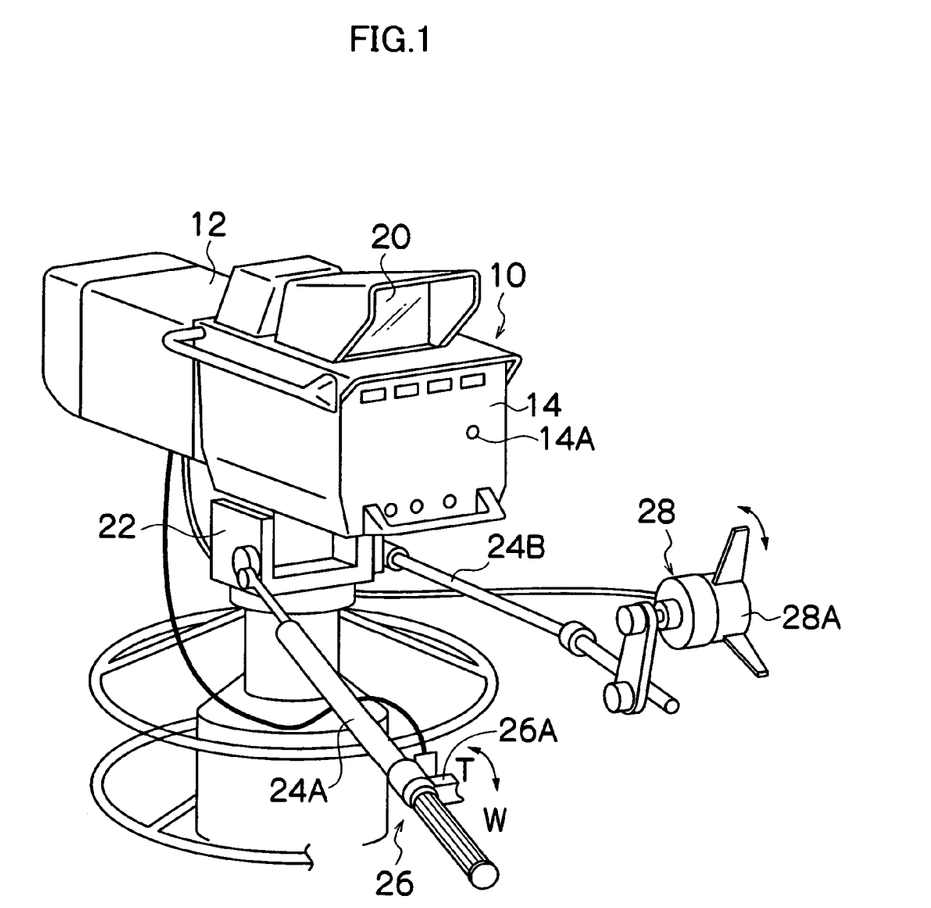
FIG. 1 is a perspective view of the entire construction of a broadcasting television camera system to which the present invention is applied.

FIG. 1 is a perspective view of the entire construction of a broadcasting television camera system to which the present invention is applied. As shown in FIG. 1, a television camera 10 is constituted by a lens unit 12 and a camera body 14, and the lens unit 12 is attached to a front portion of the camera body 14 mounted on a panhead 22.

A zoom rate demand 26 (hereinafter referred to as zoom demand 26) and a focus position demand 28 (hereinafter referred to as focus demand 28) are attached to end portions of pan/tilt rods 24A and 24B, respectively, extending from the panhead 22.

The lens unit 12 has an optical system for forming an image of an object on an image pickup device in the camera body 14. In the optical system, a zoom lens which is a movable lens for zooming capable of moving in the optical axis direction and a focusing lens for controlling a focus are disposed. The zoom demand 26 has a turnable thumb ring 26A, and transmits, to lens unit 12, via a cable, control data indicating a target speed of zooming (zoom lens) in zoom control in the lens unit 12 according to the amount of turning of the thumb ring 26A.

The focus demand 28 has a focusing knob 28A endlessly turnable without any limit to the range of turning, and transmits, to the lens unit 12, via a cable, control data indicating the position of a target focus (focusing lens) in focusing control in the lens unit 12 according to the amount of operation (the amount of change in the rotational position) of the focusing knob 28A.

A cameraperson can perform a zooming operation by turning the thumb ring 26 of the zoom demand 26 with his/her thumb while viewing a picture imaged in a viewfinder 20 on the camera body 14, and can perform a focusing operation by turning the focusing knob 28A of the focus demand 28 while viewing the picture.

Figure 2:
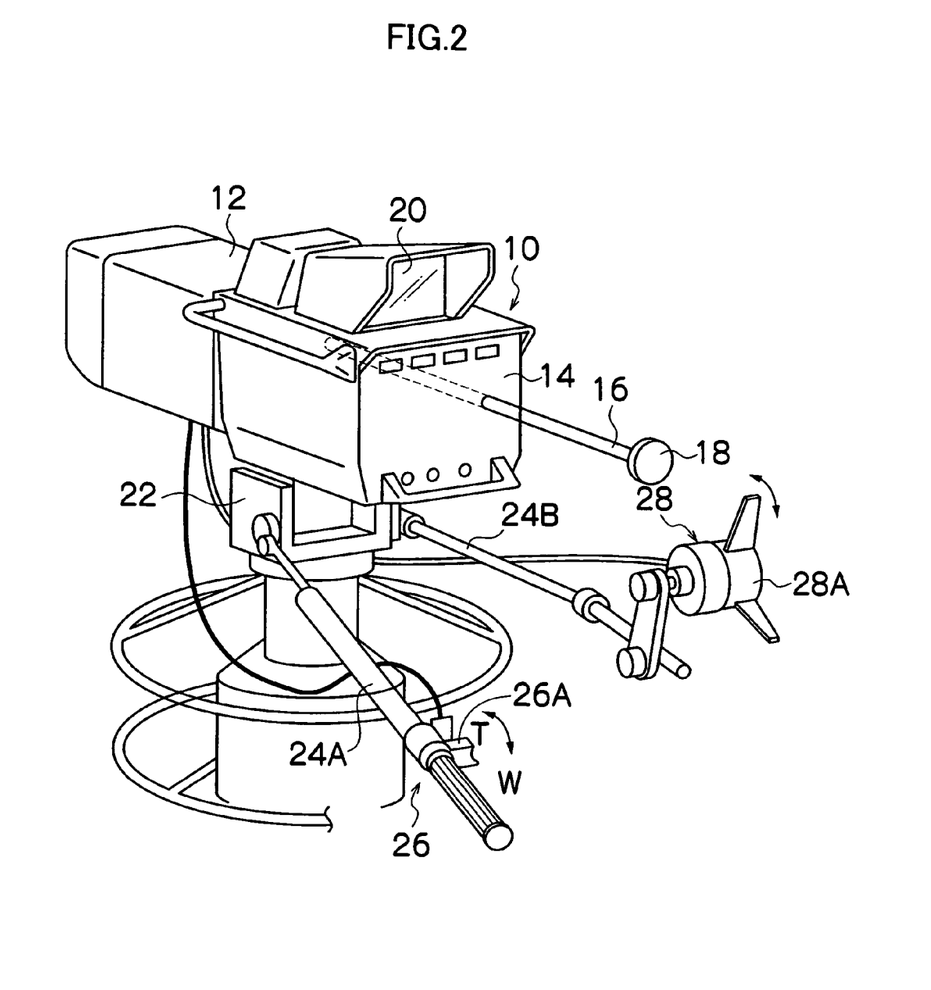
FIG. 2 is a perspective view showing a state in which an operating rod is connected to a lens unit shown in FIG. 1.

Reference character 14A in FIG. 1 denotes an operating rod insertion hole 14A in which a one rod-two operations rod 16 (hereinafter referred to as operating rod 16) attached to the lens unit 12 is inserted when the lens unit 12 is operated in an one rod-two operations manner. FIG. 2 shows a state in which the operating rod 16 is attached to the lens unit 12. As shown in FIG. 2, the operating rod 16 attached to the lens unit 12 is projecting on the rear side of the camera body 14 while being inserted in the operating rod insertion hole 14A formed in the camera body 14. A cameraperson can perform a zooming operation by gripping a finger grip portion 18 of the operating rod 16 and pushing or pull the operating rod 16 while viewing a picture imaged in the viewfinder 20 on the camera body 14, and can perform a focusing operation by gripping the finger grip portion 18 of the operating rod 16 and turning the operating rod 16 about the axis of the same while viewing the picture.

In the case where the operating rod 16, the zoom demand 26 and the focus demand 28 are attached as shown in FIG. 2, a cameraperson can select using the operating rod 16 or using the zoom demand 26 and the focus demand 28 according to image taking situation or his/her preference with respect to zooming and focusing operations, for example, by operating a predetermined switch provided on the lens unit 12.

Figure 3:
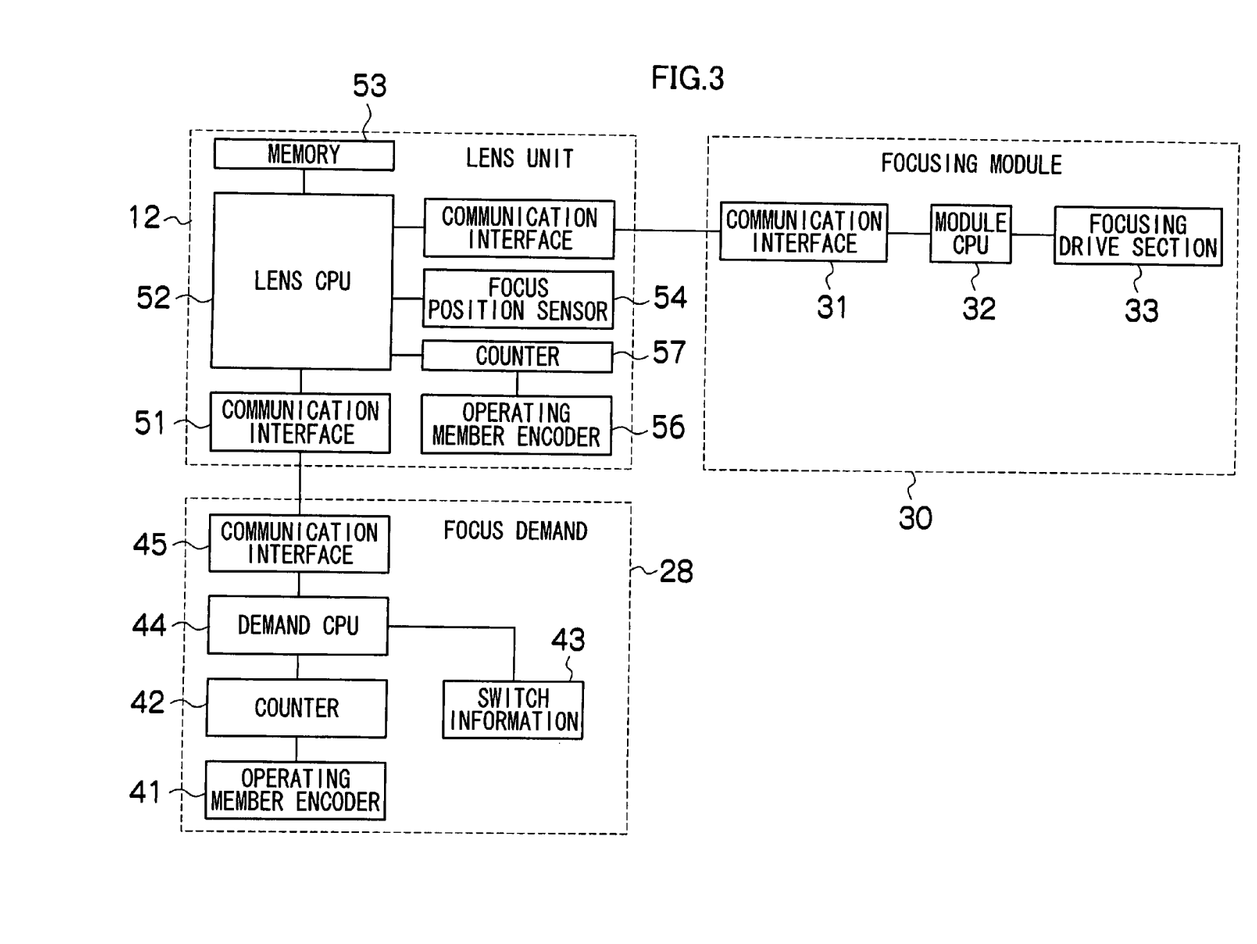
FIG. 3 is a block diagram showing an electrical configuration relating to focus control in the lens control system in accordance with the present invention.

Focusing control in the lens control system for controlling the optical system of the above-described lens unit 12 will be described. FIG. 3 is a block diagram showing an electrical configuration relating to focusing control in the lens control system for the lens unit 12.

As shown in FIG. 3, the lens control system for the lens unit 12 is constituted by a circuit incorporated in the lens unit 12, a circuit incorporated in the focus demand 28 and connected to the lens unit 12 via a cable, and a circuit incorporated in a focusing module 30 attached to the lens unit 12.

In the focus demand 28, a detection shaft of an operating member encoder (incremental-type encoder) 41 is connected to the focusing knob 28A, and a pulse signal having the number of pulses proportional to the amount of operation (the amount of change in the rotational position) of the focusing knob 28A is output from the operating member encoder 41. The number of pulses in the pulse signal output from the operating member encoder 41 is counted by a counter 42, and the count value is read as control data to a demand CPU 44. For example, pulse signals having phases A and B differing from each other by 90 degrees are output from the operating member encoder 41. The direction of rotation of the focusing knob 28A is detected from the relationship between these phases, and the count value in the counter 42 is increased or reduced according to the direction of rotation. For example, when the focusing knob 28A is turned for focusing toward the infinity end, the count value in the counter 42 is increased. When the focusing knob 28A is turned for focusing toward the point-blank end, the count value in the counter 42 is reduced. The counter 42 is, for example, a 14-bit counter which outputs control data in the range of 0 to 16383. When the focusing knob 28A is turned for focusing toward the infinity end to cause an overflow of the count value (beyond 16383), the count value is returned to 0. When the focusing knob 28A is turned for focusing toward the point-blank end to cause an overflow of the count value (beyond 0), the count value is returned to 16383.

The demand CPU 44 is capable of exchanging various signals with a lens CPU 52 in the lens unit 12 via communication interfaces 45 and 51. The demand CPU 44 sends to the lens CPU 52 the control data read from the counter 42 as described above. This data is sent as control data ctrl indicating the position of a target focus.

The focus demand 28 is provided with various switches (including a return switch and a focus preset switch) relating to lens control and so on. Switch information indicating the states of the switches is read to the demand CPU 44 and processing based on the switch information is performed in the demand CPU 44. If the processing based on the switch information relates to processing in the lens unit 12, a command for executing this processing is sent from the demand CPU 44 to the lens CPU 52.

In the lens unit 12, a detection shaft of an operating member encoder (incremental-type encoder) 56 is connected to the operating rod 16 (see FIG. 2), and a pulse signal having the number of pulses proportional to the amount of operation (the amount of change in the rotational position) of the operating rod 16 is output from the operating member encoder 56. The number of pulses in the pulse signal output from the operating member encoder 56 is counted by a counter 57, and the count value is read as control data ctrl indicating the position of a target focus to the lens CPU 52. The processing operations of the operating member encoder 56 and the counter 57 are performed in the same manner as those of the operating member encoder 41 and the counter 42 of the focus demand 28. Pulse signals having phases A and B differing from each other by 90 degrees are output from the operating member encoder 56. The direction of rotation of the operating rod 16 is detected from the relationship between these phases, and the count value in the counter 57 is increased or reduced according to the direction of rotation. For example, when the operating rod 16 is turned for focusing toward the infinity end, the count value in the counter 57 is increased. When the operating rod 16 is turned for focusing toward the point-blank end, the count value in the counter 57 is reduced. The counter 57 is, for example, a 14-bit counter which outputs control data in the range of 0 to 16383. When the operating rod 16 is turned for focusing toward the infinity end to cause an overflow of the count value (beyond 16383), the count value is returned to 0. When the operating rod 16 is turned for focusing toward the point-blank end to cause an overflow of the count value (beyond 0), the count value is returned to 16383.

The lens CPU 52 determines the position of a target focus (target focus position) on the basis of control data ctrl read from the demand CPU 44 of the focus command 28 or control data ctrl read from the counter 57, and sets a value ctrlout of a control output signal as a command to the focusing module 30 to cause a movement to the target focus position.

One of the servo method and the one rod-two operations method can be selected as a focusing operation method, for example, by means of a predetermined switch (not shown) provided on the lens unit 12. When the servo method is selected, the lens CPU 52 reads control data ctrl from the demand CPU 44 of the focus demand 28 and sets the value ctrlout of the control output signal on the basis of the control data ctrl. When the one rod-two operations method is selected, the lens CPU 52 reads control data ctrl from the counter 57 and sets the value ctrlout of the control output signal on the basis of the control data ctrl.

However, the arrangement may alternatively be such that control data is read both from the demand CPU 44 of the focus demand 28 and from the counter 57, and that when a change is made in one of the two control data items, the value of the control output signal is set on the basis of the one of the two control data items to make the corresponding operation effective. In this way, the focusing operation method corresponding to the operation on the corresponding operating member performed by a cameraperson according to his/her preference without any changing operation using a switch or the like is automatically made effective.

The lens CPU 52 is capable of exchanging various signals with the module CPU 32 in the focusing module 30 via communication interfaces 55 and 31. When setting the value ctrlout of the control output signal as command to cause a movement to a target focus position as described above, the lens CPU 52 sends the value ctrlout of the control output signal to the module CPU 32.

The lens unit 12 is provided with a memory 53 for recording necessary data and a focus position sensor 54 for detecting the present position of the focus (focusing lens). The lens CPU 52 obtains focus position data indicating the present position of the focus from the focus position sensor 54 as needed and reads the necessary data from the memory 53 or writes the necessary data to the memory 53.

In the focusing module 30, the module CPU 32 drives a focusing drive section 33 on the basis of the value ctrlout of the control output signal given from the lens CPU 52 to move the focusing lens of the lens unit 12 to the target focus position according to the command through the control output signal.

With the above-described construction and processing, the focusing lens of the lens unit 12 is moved to change the focus position according to a focusing knob 28A turning operation in the focus demand 28 or an operating rod 16 turning operation in the lens unit 12.

Figure 4:
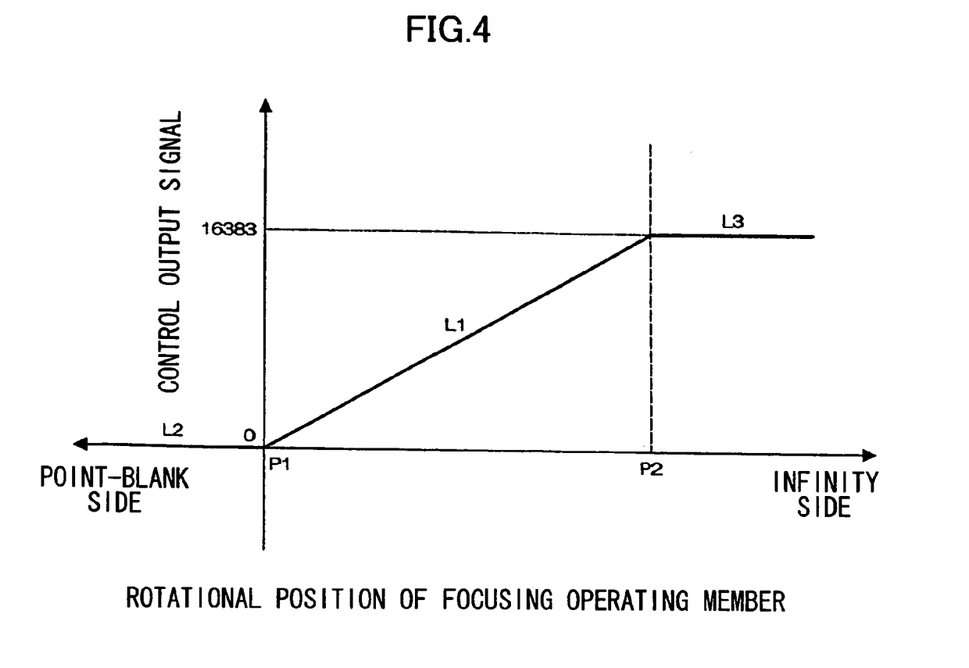
FIG. 4 is a diagram for explaining over-operation control in focus control.

Processing for focus control in the above-described lens CPU 52 will be described in detail. The lens CPU 52 successively sends to the focusing module 30 the value ctrlout of the control output signal as a command to cause a movement to a target focus position. The lens CPU 52 executes processing described below with reference to FIGS. 7 and 8 to set the value ctrlout of the control output signal. The value ctrlout of the control output signal is set in processing for over-operation control. The over-operation control will first be outlined. FIG. 4 is a diagram showing the relationship between the rotational position of an endlessly turnable focusing operating member such as the focusing knob 28A of the focus demand 28 or the operating rod 16 and the value ctrlout of the control output signal sent to the focus module 30 with respect to the rotational position. The value ctrlout of the control output signal changes in the range from 0 to 16383. The value 0 corresponds to a command designating the point-blank end as a target focus position, and the value 16383 corresponds to a command designating the infinity end as a target focus position. When the focusing operating member is turned in a state where the focus is set at a position other than the end of the movable range, the value ctrlout of the control output signal changes in the range from 0 to 16383 according to the change in rotational position of the focusing operating member, as indicating a slanting straight line L1 in FIG. 4, thereby changing the focus. When the focusing operating member reaches a rotational position P1 or P2 and when the value ctrlout of the control output signal becomes 0 or 16383, the value ctrlout of the control output signal is limited to 0 or 16383 by limitation processing described below, as indicated by a straight line L2 or L3, even if an operation to further turn the focusing operating member out of the range (on the point-blank side at the rotational position P1 or the infinity side at the rotational position P2) is performed. The focus is thereby stopped at the position at the point-bland end or the infinity end.

According to the conventional art (in a case where over-operation control is not performed), when the focusing operating member is inwardly turned (toward the infinity end from the point-blank side of the rotational position P1 or toward the point-blank end from the infinity side of the rotational position P2) in such a state, the movement of the focus from the present position at the end toward the opposite end is immediately started.

Figure 5:
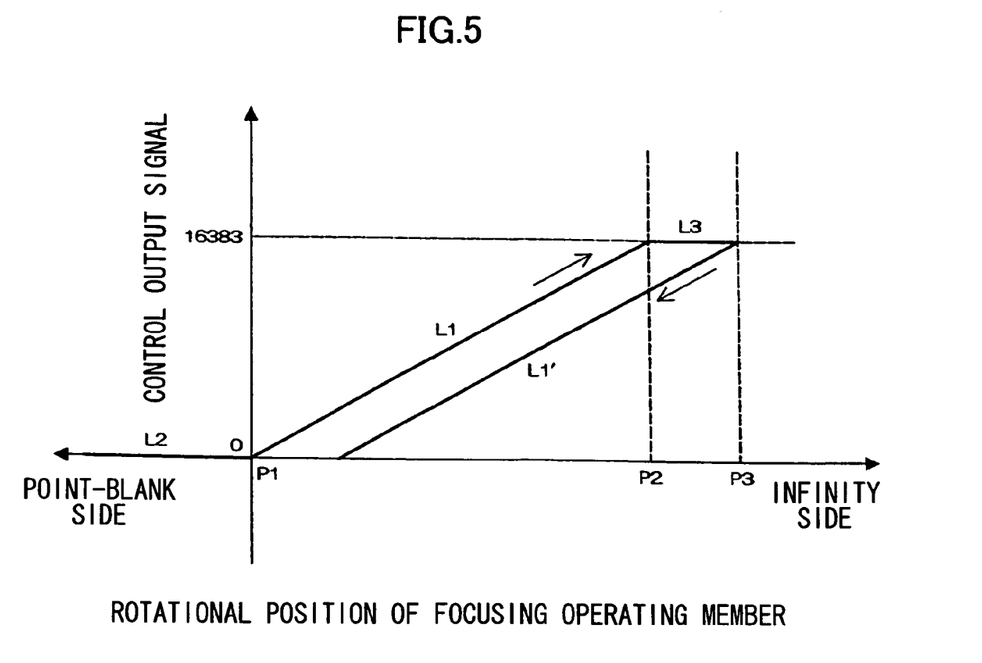
FIG. 5 is a diagram for explaining over-operation control in focus control.

A case will be considered in which, for example, referring to FIG. 5, the focusing operating member is turned toward the infinity end to reach a rotational position indicated by a point P3 beyond the rotational position P2 corresponding to the infinity end. In this case, the value ctrlout of the control output signal changes in accordance with the straight line L1 before the focusing operating member reaches the point P2. When the rotational position of the focusing operating member moves beyond the point P2, the value ctrlout of the control output signal coincides with the straight line L3 and does not change from 16383; the focus is stopped at the infinity end. If the focusing operating member is turned toward the point-blank end from the rotational position indicated by the point P3, the value ctrlout of the control output signal changes toward 0 with the change in rotational position of the focusing operating member from the time at which the operation to turn to the point-blank end is started (rotational position P3), as indicated by a straight line L'. In this case, the focus position will be changed even if the rotational position of the focusing operating member is not changed. Thus, in some case of ensuring instant reproduction of a certain focus position by enabling setting of the focusing operating member to the same rotational position by attaching a mark or the like, there is a possibility of failure to reproduce the initial focus position.

Figure 6:
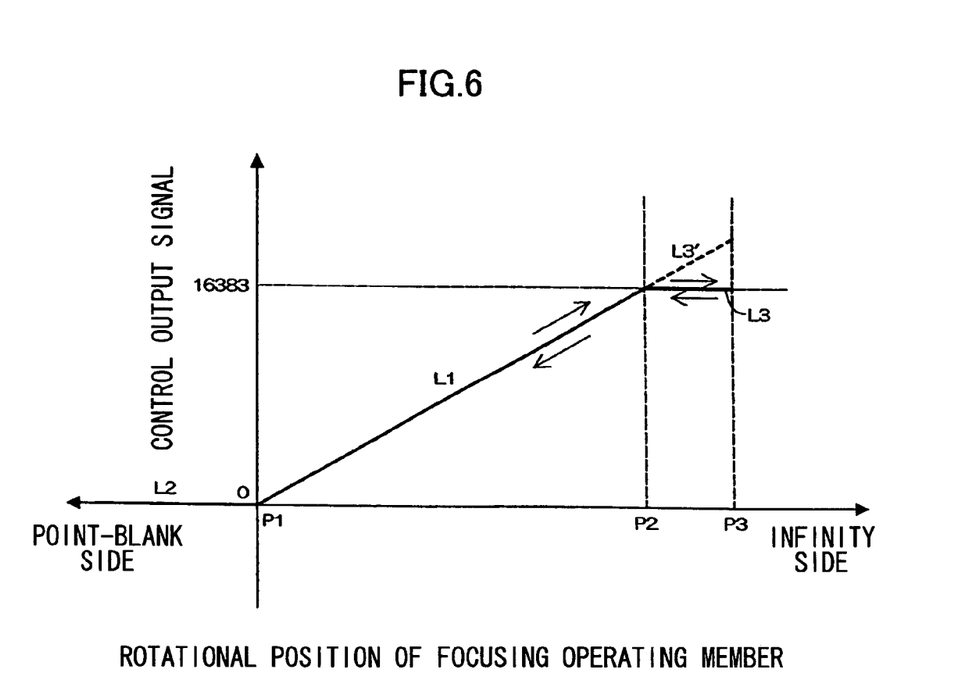
FIG. 6 is a diagram for explaining over-operation control in focus control.

In contrast, if the focusing operating member is set at a certain rotational position in the case where over-operation control is performed, the focus position is also set at the corresponding fixed position. A case will be considered in which, for example, referring to FIG. 6, the focusing operating member is turned toward the infinity end to reach the rotational position indicated by the point P3 beyond the rotational position P2 corresponding to the infinity end, as in the case shown in FIG. 5. In this case, the value ctrlout of the control output signal changes in accordance with the straight line L1 before the focusing operating member reaches the point P2. When the rotational position of the focusing operating member moves beyond the point P1, the value ctrlout of the control output signal coincides with the straight line L3 and does not change from 16383; the focus is stopped at the infinity end. If the focusing operating member is turned toward the point-blank end from the rotational position indicated by the point P3, the value ctrlout of the control output signal coincides with the straight line L3 and does not change from 16383 before the rotational position of the focusing operating member reaches the point P2; the focus is stopped at the infinity end. When the rotational position of the focusing operating member is further moved toward the point-blank end, the value ctrlout of the control output signal changes in accordance with the straight line L1 and the focus is changed toward point-blank end. That is, in over-operation control, a temporary value ctrlout1 of the control output signal corresponding to the rotational position of the focusing operating member is set separately from the value ctrlout of the control output signal. For example, in a case where the rotational position of the focusing operating member is set beyond the point P2 on the infinity side, the temporary value ctrlout1 of the control output signal is set in correspondence with the rotational position of the focusing operating member, as indicated by a straight line L3' in FIG. 6. Limitation processing is then performed on the temporary value ctrlout1 of the control output signal to set the value ctrlout of the control output signal to be actually sent to the focusing module, as indicated by the straight line L3. In this way, the position of the focus is fixed with respect to the rotational position of the focusing operating member. Accordingly, a fixed focus position can be instantly reproduced if a mark or the line is provided to enable setting of the focusing operating member at the same rotational position.

Processing for focus control in the lens CPU 52 will be described in detail with reference to FIGS. 7 and 8. The lens CPU 52 repeats sending to the focus module 30 the value ctrlout of the control output signal at predetermined intervals as a command to the focus module 30 to cause a movement to a target focus position, and correspondingly repeats executing control output signal setting processing shown in FIGS. 7 and 8.

Figure 7:
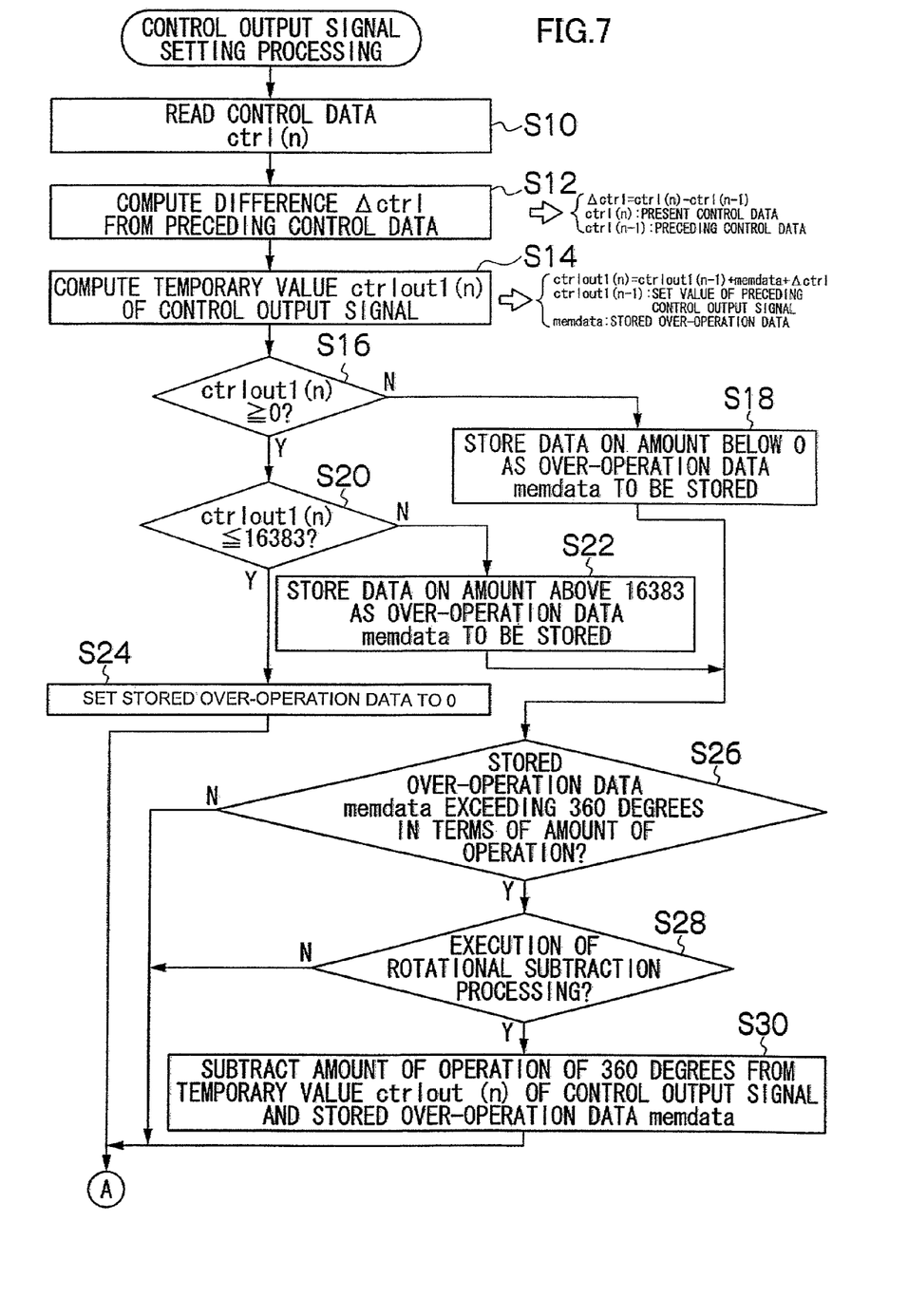
FIG. 7 is a flowchart showing the process of focusing control in a lens CPU in the lens unit.

When starting control output signal setting processing, the lens CPU 52 first reads control data ctrl (n) corresponding to the focusing operation method presently made effective, as shown in FIG. 7 (step S10). That is, in the case where the servo method in the servo and one rod-two operations methods is selected by means of the predetermined switch, the lens CPU 52 reads control data ctrl (n) from the demand CPU 44 of the focus demand 28. In the case where the one rod-two operations method is selected, the lens CPU 52 reads control data ctrl (n) from the counter 57 in the lens unit 12. The symbol n in the parentheses for control data ctrl (n) indicated the number of times this control output signal setting processing is performed.

Subsequently, the lens CPU 52 computes the difference Δctrl (=ctrl(n)−ctrl (n−1)) between control data read in the control output signal setting processing performed at the preceding time (preceding control data ctrl (n−1)) and the control data presently read in step S10 (present control data ctrl (n)) (step S12). That is, the amount of change from the preceding rotational position of the focusing knob 28A of the focus demand 28 or the operating rod 16 is obtained.

The lens CPU 52 determines whether or not an overflow of control data ctrl (n) read in step S10 has occurred, and suitably computes the difference Δctrl. That is, control data ctrl (n) has the same value as the count value of the counter 42 or the counter 57 counting the number of pulses in the pulse signal output from the operating member encoder 41 or the operating member encoder 56. The value of control data ctrl (n) ranges from the minimum value 0 to the maximum value 16383. When the value of control data ctrl (n) becomes larger than 16383 (in the case of overflowing on the plus side), it becomes the minimum value 0. When the value of control data ctrl (n) becomes smaller than 0 (in the case of overflowing on the minus side), it becomes the maximum value 16383. It is thought that there is no possibility of the difference Δctrl exceeding ±1000 in the time period from reading of the preceding control data ctrl (n−1) to reading of the present control data ctrl (n). Therefore, when the difference Δctrl obtained by ctrl (n)−ctrl (n−1) is smaller than −1000 (Δctrl<−1000), it is determined that an overflow on the plus side has occurred; the maximum value 16383 is added to the difference; and the result of this addition is set as the correct difference Δctrl. When the difference Δctrl obtained by ctrl (n)−ctrl (n−1) is larger than 1000 (Δctrl>1000), it is determined that an overflow on the minus side has occurred; the maximum value 16383 is subtracted from the difference; and the result of this subtraction is set as the correct difference Δctrl.

After obtaining the difference Δctrl between the preceding control data ctrl (n−1) and the present control data ctrl (n), the lens CPU 52 computes, as the temporary value ctrlout1 (n) of the control output signal, a value obtained by adding together the set value ctrlout (n−1) of the control output signal set as a normal target focus position in step S38 described below at the preceding time of the control output signal setting processing, a stored over-operation data memdata described below and the above-described difference Δctrl (step S14). This temporary value ctrlout1 (n) of the control output signal represents a temporary target focus position (temporary target position). If no set value ctrlout (n−1) of the preceding control output signal exists at the time of initial execution of this control output signal setting processing for example, the value in the case of setting as a target position the actual focus position obtained from the focus position sensor 54 is used as the preceding set value ctrlout (n−1) of the control output signal.

Subsequently, the lens CPU 52 determines whether or not the temporary value ctrlout1(n) computed in step S14 is equal to or larger than 0 (step S16). The value of the control output signal in the case where the target focus position is the point-blank end is assumed to be 0, and the value of the control output signal in the case where the target focus position is the infinite end is assumed to be 16383.

If the result of determination in step S16 is NO, that is, the temporary value ctrlout1 (n) is smaller than the point-blank-end value 0, the value by which the temporary value is lower than 0 (i.e., temporary value ctrlout1 ($n$)−0=temporary value ctrlout1 ($n$)) is stored as stored over-operation data memdata in the memory 53 (step S18).

If the result of determination in step S16 is YES, determination is then made as to whether or not the temporary value ctrlout1 ($n$) of the control output signal is equal to or smaller than the infinity-end value 16383 (step S20). If the result of determination in step S20 is NO, that is, the temporary value ctrlout1 ($n$) of the control output signal exceeds the infinity-end value 16383, the value by which the temporary value is larger than the infinity-end value 16383 (i.e., temporary value ctrlout1 ($n$)−16383) is stored as stored over-operation data memdata in the memory 53 (step S22).

If the result of determination in step S16 or step S20 is YES, that is, the temporary value ctrlout1 ($n$) of the control output signal is within the range from the point-blank-end value 0 to the infinity-end value 16383, the stored over-operation data memdata is set to 0 (step S24). The over-operation data memdata indicates the amount of operation of the focusing operating member (focusing knob 28A of the focus demand 28 or the operating rod 16) operated beyond the movable range of the focus.

After storing the over-operation data memdata to be stored in step S18 or S20, the lens CPU 52 determines whether or not the amount of operation of the focusing operating member (the change in rotational position (angle)) corresponding to the size of the stored over-operation data memdata has exceeded 360 degrees (step S26). That is, the lens CPU 52 determines whether or not the amount of over-operation has exceeded one revolution of the focusing operating member. If the result of determination is NO, the process moves to step S32 in FIG. 8 without performing any special processing.

If the result of this determination is YES, determination is made as to whether or not rotation subtraction processing should be executed (step S28). An operator can make selection by means of a predetermined switch as to whether or not rotation subtraction processing should be executed. If the result of this determination is YES, the temporary value ctrlout1 ($n$) of the control output signal obtained in step S14 and the stored over-operation data memdata are changed to values obtained by subtracting the amount of change through the rotational angle 360 degrees (step S30), and the process advances step S32 in FIG. 8.

Figure 8:
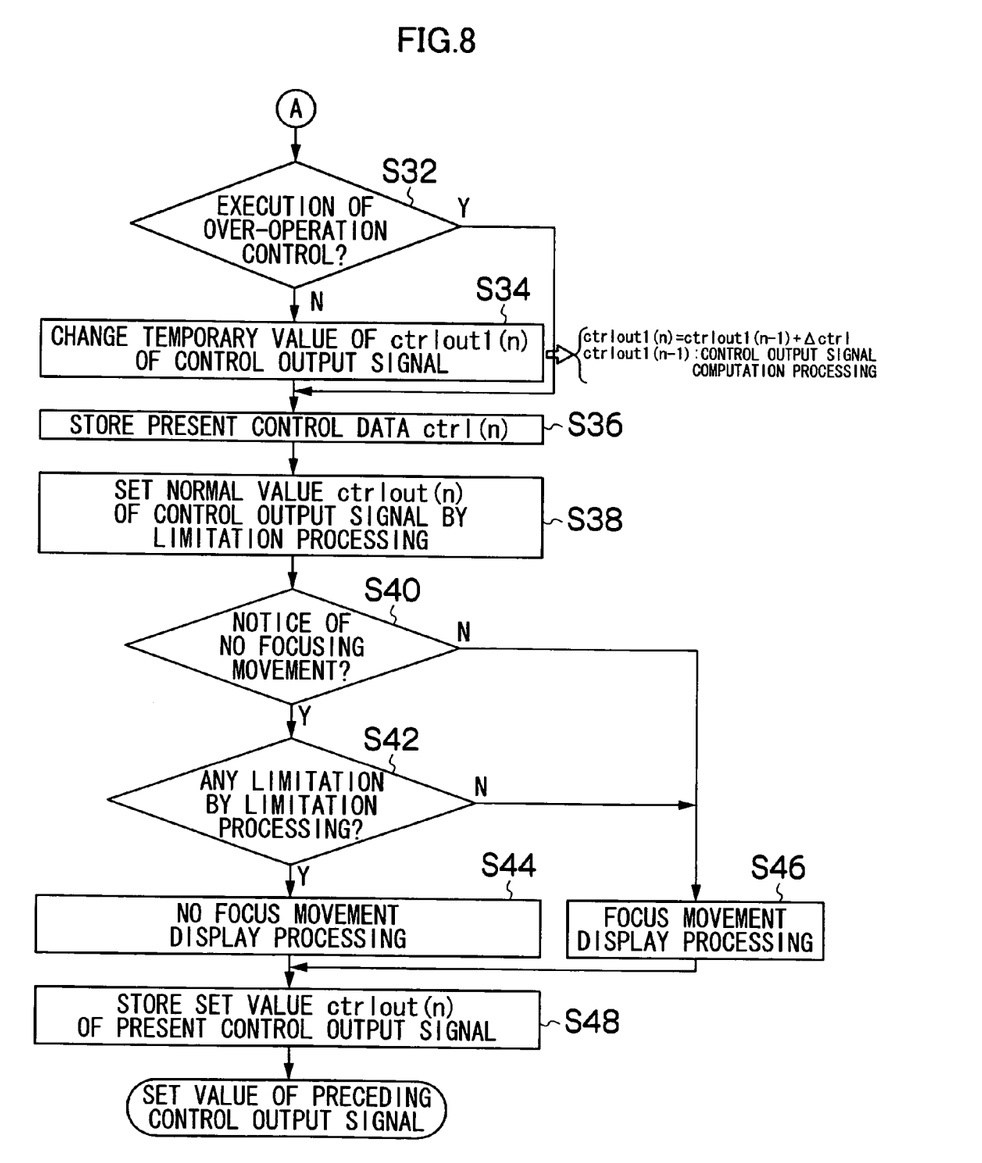
FIG. 8 is a flowchart showing the process of focusing control in a lens CPU in the lens unit.

If the result of determination in step S28 is NO, the process moves to step S32 in FIG. 8 without performing the processing in step S30. The rotation subtraction processing in step S30 is provided by considering that the operation corresponding to one revolution of the focusing operating member after exceeding the limit of the movable range of the focus is virtually equal to a state where no operation is performed.

After transition to step 32 in FIG. 8 by the above-described processing in one of steps S24 to S30, the lens CPU 52 determines whether or not the above-described over-operation control should be performed in the process shown in the flowchart of FIG. 8 (step S32). The operator can make selection as to whether or not over-operation control should be performed by means of a predetermined switch. If the result of determination is NO, the temporary value ctrlout1 ($n$) of the control output signal obtained in step S14 or step S30 is changed, that is, the value obtained by adding the difference Δctrl obtained in step S12 to the temporary value ctrlout (n−1) of the control output signal set as a normal target position of the focus in step S38 described below at the preceding time of the control output signal setting processing is changed as the temporary value ctrlout1 ($n$) of the control output signal (step S34). That is, ctrlout1 ($n$)=ctrlout (n−1)+Δctrl. The process then advances to step S36. If the result of the determination is YES in step S32, the process advances to step S36 without any change in the currently set temporary value ctrlout 1($n$) of the control output signal.

In step S36, the lens CPU 52 stores the present control data value ctrl (n) in the memory 53 (step S36). The lens CPU 52 then performs limitation processing on the temporary value ctrlout1 ($n$) to set the value ctrlout (n) of the control output signal indicating a normal target focus position (step S38). That is, the temporary value ctrlout1 ($n$) of the control output signal is limited within the range from the minimum value 0 to the maximum value 16383. If the temporary valu e ctrlout1 ($n$) of the control output signal is within the range from the minimum value 0 to the maximum value 16383, the temporary value ctrlout1 ($n$) is immediately set as the normal value ctrlout (n) of the control output signal. If the temporary value ctrlout1 ($n$) of the control output signal is smaller than 0, 0 is set as the normal value ctrlout (n) of the control output signal. If the temporary value ctrlout1 ($n$) of the control output signal is larger than 16383, 16383 is set as the normal value ctrlout (n) of the control output signal.

Subsequently, the lens CPU 52 determines whether or not the present mode is a mode for notifying a state in which no focus movement is made (step S40). For example, a state where the focus is at the movable end and cannot be moved by operating the focusing operating member can be indicated by means of displayed characters, a symbol, a figure or the like on a lamp or the viewfinder 20 provided on the focus demand 28 or the lens unit 12, thereby enabling the operator to select the mode in which such a display is produced or not produced, by means of a predetermined switch. If the result of this determination is YES, that is, the mode for notifying a state in which no focus movement is made is selected, determination is then made as to whether or not the temporary value ctrlout1 ($n$) of the control output signal is limited by the above-described limitation processing in step S38 (step S42). If the result of this determination is YES, display for notifying no focus movement is executed (step S44). If the result of determination is NO, display for notifying a focus movement is executed (step S46). If the result of determination in step S46 is YES, display for notifying a focus movement is executed at all times (step S46).

The lens CPU 52 then stores in the memory 53 the normal set value ctrlout (n) of the control output signal set in step S38 (step S48).

When the value ctrlout (n) of the control output signal is set by the above-described control output signal setting processing, the set value ctrlout (n) is sent to the focusing module 30 and the focusing lens is moved to the position corresponding to the value ctrlout (n) of the control output signal.

While the embodiment has been described with respect to an implementation using the focusing knob 28A of the focus demand 28 and the operating member 16 as a focusing operating member, the present invention can also be applied to a case where focusing control is performed by means of an endlessly turnable focusing operating member of a different controller connected to the lens unit 12 via the camera body 14 or the like. The present invention can also be applied to a lens control system capable of control of a movable lens by means of an endlessly turnable operating member not limited to focusing control. The above-described over-operation control is not limited to control performed by the CPU in the lens unit 12. The over-operation control may alternatively be performed with a CPU in a controller or the like.

Selection as to whether or not the over-operation control should be performed may be automatically made. For example, if the focusing operating member is not of an endlessly turnable type, automatic execution of the cover-operation control may be prohibited.

What is claimed is:

1. A lens control system comprising:
   an endlessly turnable operating member for indicating the position of a movable lens in an optical system for imaging a picture;
   a relative position detection device which detects the amount of change in the rotational position of the operating member;
   a temporary target position setting device which sets temporary target positions of the movable lens one after another, which obtains from the relative position detection device the amount of change in the rotational position of the operating member after setting the preceding temporary target position, and which sets, as the present temporary target position, the position displaced from the preceding temporary target position by the amount of displacement corresponding to the obtained amount of change, the temporary target position setting device storing an amount of change in the rotational position of the operating member beyond a movable range of the movable lens when the temporary target position is out of the movable range of the movable lens;
   a normal target position setting device which sets normal target positions of the movable lens one after another, which, when the temporary target position set by the temporary target position setting device is within the movable range of the movable lens, sets as a normal target position the temporary target position set by the temporary target position setting device, and which, when the temporary target position set by the temporary target position setting device is out of the movable range of the movable lens, sets as a normal target position the position at the end of the movable range closer to the temporary target position; and
   a lens control device which moves the movable lens to the normal target position set by the normal target position setting device.

2. The lens control system according to claim 1, wherein the temporary target position setting device obtains from the relative position detection device the amount of change in the rotational position of the operating member after setting the preceding temporary target position, and wherein, when the position displaced from the preceding temporary target position by the amount of displacement corresponding to the obtained amount of change is out of the movable range of the movable lens, and when the amount of change from the position at the end of the movable range closer to the displaced position to the displaced position is larger than the amount of displacement corresponding to the amount of change of the rotational position of the operating member through 360 degrees, the temporary target position setting device sets as the present temporary target position the position displaced by the amount of displacement corresponding to the amount of change in the rotational position of the operating member through 360 degrees from the displaced position to the position of the end.

3. The lens control system according to claim 1, further comprising:
   the temporary target position setting device as a first temporary target position setting device;
   a second temporary target position setting device which sets temporary target positions of the movable lens one after another, which obtains from the relative position detection device the amount of change in the rotational position of the operating member after setting the preceding temporary target position, which, when the position displaced from the preceding temporary target position by the amount of displacement corresponding to the obtained amount of change is within the movable range of the movable lens, sets the displaced position as the present temporary target position, and which, when the position displaced from the preceding temporary target position by the amount of displacement corresponding to the obtained amount of change is out of the movable range of the movable lens, sets as the present temporary target position the position displaced by the amount of displacement corresponding to the amount of change from the position of the end of the movable range closer to the displaced position; and
   a selecting device which makes selection as to which of the temporary target position set by the first temporary target position setting device and the temporary target position set by the second temporary target position setting device should be made effective,
   wherein the normal target position setting device sets the normal target position on the basis of the temporary target position made effective by the selecting device.

4. The lens control system according to claim 2, further comprising:
   the temporary target position setting device as a first temporary target position setting device;
   a second temporary target position setting device which sets temporary target positions of the movable lens one after another, which obtains from the relative position detection device the amount of change in the rotational position of the operating member after setting the preceding temporary target position, which, when the position displaced from the preceding temporary target position by the amount of displacement corresponding to the obtained amount of change is within the movable range of the movable lens, sets the displaced position as the present temporary target position, and which, when the position displaced from the preceding temporary target position by the amount of displacement corresponding to the obtained amount of change is out of the movable range of the movable lens, sets as the present temporary target position the position displaced by the amount of displacement corresponding to the amount of change from the position of the end of the movable range closer to the displaced position; and
   a selecting device which makes selection as to which of the temporary target position set by the first temporary target position setting device and the temporary target position set by the second temporary target position setting device should be made effective,
   wherein the normal target position setting device sets the normal target position on the basis of the temporary target position made effective by the selecting device.

5. The lens control system according to claim 1, wherein the movable lens comprises a lens for changing a focus of the optical system.

6. The lens control system according to claim 2, wherein the movable lens comprises a lens for changing a focus of the optical system.

7. The lens control system according to claim 3, wherein the movable lens comprises a lens for changing a focus of the optical system.

8. The lens control system according to claim 4, wherein the movable lens comprises a lens for changing a focus of the optical system.

9. The lens control system according to claim 5, wherein the operating member comprises an operating member for focusing provided in a focus controller connected to a lens unit having the optical system.

10. The lens control system according to claim 6, wherein the operating member comprises an operating member for focusing provided in a focus controller connected to a lens unit having the optical system.

11. The lens control system according to claim 7, wherein the operating member comprises an operating member for focusing provided in a focus controller connected to a lens unit having the optical system.

12. The lens control system according to claim 8, wherein the operating member comprises an operating member for focusing provided in a focus controller connected to a lens unit having the optical system.

13. The lens control system according to claim 9, wherein the operating member comprises an operating rod turned for focusing, the operating rod being provided on a lens unit having the optical system.

14. The lens control system according to claim 10, wherein the operating member comprises an operating rod turned for focusing, the operating rod being provided on a lens unit having the optical system.

15. The lens control system according to claim 11, wherein the operating member comprises an operating rod turned for focusing, the operating rod being provided on a lens unit having the optical system.

16. The lens control system according to claim 12, wherein the operating member comprises an operating rod turned for focusing, the operating rod being provided on a lens unit having the optical system.

* * * * *